UNITED STATES PATENT OFFICE 2,420,008

DISAZO DYES CONTAINING HIGHER ACYLAMINO GROUP

Henry Charles Olpin, Edmund Stanley, and Christopher Stanley Argyle, Spondon, near Derby, England, assignors to British Celanese Limited, London, England, a company of Great Britain No Drawing. Application June 27, 1942, Serial No. 448,834. In Great Britain July 25, 1941

7 Claims. (Cl. 260—187)

This invention relates to the manufacture of new disazo dyes and other polyazo dyes and more particularly to the manufacture of dyes of this kind which are soluble in organic liquids and are useful for colouring solutions of film-forming materials in organic liquids.

According to the present invention the new disazo and other polyazo dyes are obtained by coupling a diazotised amino-azo compound with an N-di-alkyl aniline or other N-substituted aniline capable of coupling in para position to the amino group and having, as a substituent in meta position to the substituted amino group, an amino group acidylated with an aliphatic acid containing at least 9 carbon atoms. An N-di-alkyl aniline of this character is, for instance, a 3-stearoyl - amino - 1 - diethyl - amino - benzene (which can be obtained by the action of stearic acid chloride on 3-amino-1-diethyl-amino-benzene).

These new dyes are very valuable for incorporation in fibres of cellulose acetate or other cellulose ester or ether. In the first place, with their aid it is possible to impart to such fibres colourations which are very resistant to aqueous treatment and are clear and free from any greasy appearance. Secondly, they are for the most part of very good solubility in organic liquids, particularly acetone, and therefore can be dissolved in the cellulose ester or ether solutions from which such fibres are most conveniently manufactured. Coloured films, foils and similar shaped articles of cellulose acetate or other cellulose esters or ethers containing these dyes are described and claimed, inter alia, in companion U. S. application S. No. 448,833, filed June 27, 1942, now Patent No. 2,393,652.

The coupling component, namely the N-substituted-aniline having, as a substituent in the meta position to the amino group, an amino group acidylated with aliphatic acid containing at least 9 carbon atoms, should be one capable of coupling in para position to the substituted amino group. The N-substituents of a coupling component can be, for example, alkyl, cyclo-alkyl, aryl, or aralkyl groups, for example methyl, ethyl, beta-hydroxyethyl, or beta-hydroxypropyl, cyclohexyl or benzyl.

Coupling components particularly suitable for purposes of the invention are the mono-acidyl-m-phenylene diamines of the general formula

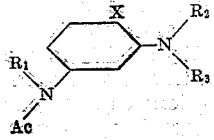

wherein X represents hydrogen, halogen, alkyl or alkoxy (including substituted alkoxy, e. g. beta-hydroxyethoxy), Ac represents an acidyl group derived from an aliphatic acid containing at least 9 carbon atoms, $R_1$ represents hydrogen or alkyl (including substituted alkyl, e. g. beta-hydroxy-ethyl or other hydroxyalkyl), and $R_2$ and $R_3$ represent organic substituents for example, alkyl, aryl, aralkyl or cycloalkyl groups (including substituted alkyl, aryl, aralkyl or cycloalkyl groups) or where $R_2$ represents an organic substituents and $R_3$ represents hydrogen. If desired $R_2$ and $R_3$ may together constitute a chain of methylene groups forming, together with the associated nitrogen atom, a heterocyclic ring, for example the piperidine ring.

The acid radicle of the acidylamino group present in the coupling component is advantageously one containing at least 12 carbon atoms and may be either saturated or unsaturated. Examples of such radicles are those of lauric acid, palmitic acid, stearic acid and oleic acid.

Diazo components suitable for the purposes of the invention are azo-benzenes, azo- alpha-naphthalenes and benzene-azo-alpha-naphthalenes containing one or two diazotisable amino groups in para positions to azo groups. Substituents may be present in addition to the diazotisable amino groups and the azo groups, for example alkyl groups, acidylamino groups, alkoxy groups, e. g. methoxy or ethoxy groups, halogen atoms or nitro groups, the latter two types of substituents more particularly in a nucleus which does not contain a diazotisable amino group. Acidylamino groups, when present, can be those in which the acidyl radicle is that of an aromatic or aliphatic carboxylic acid, for example of benzoic acid, or of acetic acid, or other fatty acid containing less than 5 carbon atoms. Sulphonic and carboxylic groups are preferably absent from the diazo components.

Amino-azo compounds, very useful as diazo components, are those obtainable by coupling with para-coupling primary amines diazo compounds of aniline, toluidines, anisidines, phenetidines, alpha-naphthylamine, and their halogen, nitro, and halogen-nitro derivatives (e. g. o-, m-, and p-nitroaniline, 2-chlor-4-nitroaniline, and 4-chlor-3-nitraniline). The para-coupling primary amines include such as contain acidylamino groups; those containing an acidylamino group in meta-position to the primary amino group and especially those containing in addition an alkoxy group para to the acidylamino group are particularly useful. Specific para-coupling primary amines are m-toluidine, cresidine, p-xylidine, 2:5-dimethoxy - aniline, 2:5 - diethoxy - aniline, mono-acetyl-m-phenylene diamine, 4-acetylamino-2-amino-toluene, 2-amino-4-acetylamino-anisole, 2 - amino-4-acetylamino - 1 - betahydroxyethoxy-benzene, mono-benzoyl-m-phenylene diamine and 1-amino-3-acetyl-methylamino benzene.

Of particular value as diazo components for the purpose of the invention are 4-nitro-4'-amino-azo-benzenes, for example 4-nitro-4'-amino-azo-benzene itself or its substitution products in which the substituents are, for example, alkyl, halogen, alkoxy, or acidylamino. Those 4-nitro-4'-amino-azo-benzenes having in the benzene nucleus containing the amino group two of these substituents in para position one to the other, are of especial interest both by reason of their ready availability and by reason of their yielding, in conjunction with the coupling components employed according to the invention, shades which, as compared with those obtained in the absence of the two substituents, are displaced towards the blue end of the colour series extending from yellow to green through orange, red and blue.

Diamino azo compounds can also be used, e. g. those which can be obtained by reducing a nitro group of such of the above mono-amino azo compounds as contain a nitro group.

The following are specific examples of aminoazo compounds which can be used:

4-nitro-4'-amino-2':5'-dimethoxy-azo-benzene
4-nitro-4'-amino-2':5'-diethoxy-azo-benzene
4-nitrobenzene-azo-alpha-naphthylamine
4-nitro-2-chlorbenzene-azo - alpha - naphthylamine
4-nitro-2-chlor-4'-amino-2'-methyl-5'-methoxy-azo-benzene
4-nitro-4'-amino-2'-acetylamino - 5' - methoxy - azo-benzene
4-nitro-2-chlor-4'-amino-2':5'-dimethoxy-azo-benzene
4-nitro-4'-amino-azo-benzene
4-nitro-4'-amino-2'-methyl-azo-benzene
4-chlor-3-nitro-4'- amino - 2' - acetylamino - 5' - methoxy-azo-benzene
4:4'-diamino-2'-acetylamino - 5 - methoxy - azo-benzene
4-chlor-4'-amino-2'-acetylamino - 5' - methoxy-azobenzene
4-amino-2-acetylamino- 5 - methoxy - 1:1' - benzene-azo-naphthalene (from diazotised-alpha-naphthylamine and 2-amino-4-acetyl-amino-anisole)
4-(benzeneazo)-4'-amino- 2':5' - dimethyl - azo-benzene
4-amino-azo-benzene
4-amino-4'-sulpho-azo-benzene As coupling components for the production of the new dyes especial mention may be made of the mono-acidyl-m-phenylene diamines of the formula given above, wherein X is hydrogen, and particularly those compounds where B and $R_1$ are hydrogen, $R_2$ and $R_3$ are alkyl groups, and Ac is an acidyl group derived from a fatty acid containing at least 9 carbon atoms. Examples of such compounds are the 3-stearoyl-amino and 3-lauroylamino derivatives of N-diethyl-aniline, N-dimethyl-aniline and N - di(beta - hydroxyethyl)-aniline. Coupling components of the above general formula in which X is a substituent, for example alkoxy, can also be used. Such coupling components are the N-stearoyl derivatives of the 3-amino-6-methoxy-1-diethylamino-benzene and 3-amino-6-methyl-1-diethylamino benzene.

The 3-stearoylamino-N-diethyl-aniline gives violet to blue dyes with the diazo compounds of the above list of specific amino-azo compounds with the exception of those of the last two compounds with which it yields red products.

The coupling of the diazotised amino-azo compound with the coupling component is advantageously affected in a medium consisting to a substantial extent, e. g. 50% or more, of a water-soluble organic liquid; for example acetic acid or methyl, ethyl, or propyl alcohol. Thus diazotisation can be effected in acetic acid medium and acetic acid diazo solution run into a solution of the coupling component in ethyl alcohol. Again an aqueous diazo solution can be prepared and run into an ethyl alcohol solution of the coupling component. The coupling medium should be acid during the coupling operation.

The invention is illustrated by the following examples:

Example I 138 parts of p-nitraniline are diazotised in the usual manner in aqueous solution by means of hydrochloric acid and sodium nitrite and the solution added with good stirring to a solution of 153 parts of 2:5-dimethoxyaniline and 120 parts of hydrochloric acid (32° Tw.) in 10,000 parts of water. After stirring for 1 hour the liquid is made neutral to Congo Red paper and the monoazo product is filtered off and dried. 302 parts of finely ground product are suspended in 1800 parts of acetic acid and added slowly to a solution of nitrosyl sulphuric acid prepared by dissolving 69 parts of sodium nitrite in 1300 parts of sulphuric acid, warming to 70° C., and cooling to 10° C. The temperature is maintained at 10–15° C. during the addition and for 1½ hours after the base has been added. After filtering, the solution of the diazotised base is added gradually to a cooled solution of 430 parts of m-stearoylamino-diethylaniline in 5000 parts of methylated spirits and sodium acetate is added to neutralise the sulphuric acid. After stirring for 2 hours water is added till the dyestuff is precipitated. The dyestuff is now filtered, washed with methylated spirits and with water, dried, and finely ground.

It gives a navy blue solution in acetone, and is readily soluble in a 25% solution of cellulose acetate in acetone. This latter solution can be spun into filaments of blue shade which are very resistant to aqueous treatment.

Example II 198 parts of aminoazobenzene and 340 parts of hydrochloric acid (32° Tw.) are ground to a paste and diluted with 1000 parts of water and 1000 parts of ice. The base is then diazotised by addition of 70 parts of sodium nitrite dissolved in a little water. After filtering off any insoluble matter, the solution of the diazotised base is added to a solution of 430 parts of m-stearoylamino-diethylaniline in 3000 parts of methylated spirits. The mixture is stirred for 2 hours and sodium acetate is added to complete the coupling. The dyestuff is then filtered off, washed, dried and finely ground. It gives bluish-red shades in acetone and is readily soluble in a 25% solution of cellulose acetate in acetone. The coloured cellulose acetate solutions can be spun into filaments of red shade very resistant to aqueous treatment.

Having described our invention what we desire to secure by Letters Patent is:

1. A disazo dye of the formula A—N=N—Y where A is an azo benzene residue and Y is the residue of an N-alkyl aniline having as a substituent in meta position to the N-alkylamino group an amino group acidylated with an aliphatic monocarboxylic acid containing from 16 to 18 carbon atoms, said residue Y being united to the azo group at the para position to the alkylamino group.

2. A disazo dye of the formula A—N=N—Y where A is an azo benzene residue attached to the azo group at the 4'-position and having a nitro group in the 4-position, and Y is the residue of an N-alkyl aniline having as a substituent in meta position to the N-alkylamino group an amino group acidylated with an aliphatic monocarboxylic acid containing from 16 to 18 carbon atoms, said residue Y being united to the azo group at the para position to the alkylamino group.

3. A disazo dye of the formula

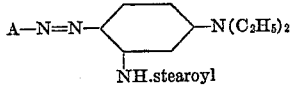

where A is an azo benzene residue.

4. A disazo dye of the formula

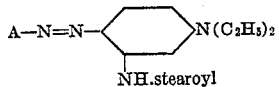

where A is an azo benzene residue attached to the azo group at the 4'-position and having a nitro group in the 4-position.

5. A disazo dye of the formula

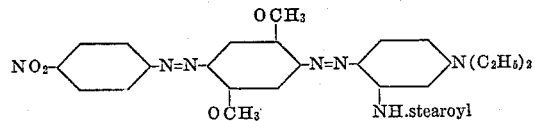

6. Process for the production of an azo dye, which comprises coupling a diazotized aminoazo compound of which the aryl nuclei are selected from the nuclei of the benzene series and nuclei of the naphthalene series with an N-alkyl aniline capable of coupling in para position to the N-alkylamino group and having as a substituent in meta position to the N-alkyl-amino group an amino group acidylated with an aliphatic mono-carboxylic acid containing from 16 to 18 carbon atoms.

7. Process for the production of an azo dye which comprises coupling a diazotized 4-nitro-4'-amino-azobenzene with 3-stearoylamino-N-diethylaniline.

HENRY CHARLES OLPIN.
EDMUND STANLEY.
CHRISTOPHER STANLEY ARGYLE.

REFERENCES CITED

The following references are of record in the file of this patent:

UNITED STATES PATENTS

| Number | Name | Date |
|---|---|---|
| 2,111,300 | Senn | Mar. 15, 1938 |
| 2,289,413 | Ellis et al. | July 14, 1942 |
| 2,083,308 | Senn | June 8, 1937 |